(12) United States Patent
Helkey

(10) Patent No.: US 6,578,974 B2
(45) Date of Patent: Jun. 17, 2003

(54) MICROMACHINED APPARATUS FOR IMPROVED REFLECTION OF LIGHT

(75) Inventor: Roger Jonathan Helkey, Montecito, CA (US)

(73) Assignee: Calient Networks, Inc., San Jose, CA (US)

( * ) Notice: Subject to any disclaimer, the term of this patent is extended or adjusted under 35 U.S.C. 154(b) by 0 days.

(21) Appl. No.: 09/948,801

(22) Filed: Sep. 7, 2001

(65) Prior Publication Data

US 2002/0018311 A1 Feb. 14, 2002

Related U.S. Application Data

(62) Division of application No. 09/574,660, filed on May 18, 2000.

(51) Int. Cl.[7] ................................................ G02B 7/182
(52) U.S. Cl. ....................... 359/879; 359/881; 359/871; 359/872; 359/224; 359/298
(58) Field of Search .................. 359/879, 881, 359/871, 872, 873, 874, 877, 224, 225, 226, 298, 848, 849

(56) References Cited

U.S. PATENT DOCUMENTS

| | | |
|---|---|---|
| 3,492,484 A | 1/1970 | Iti |
| 3,493,820 A | 2/1970 | Rosvold |
| 3,649,105 A | 3/1972 | Treuthart |
| 4,208,094 A | 6/1980 | Tomlinson, III et al. |
| 4,274,712 A | 6/1981 | Sintes |
| 4,365,863 A | 12/1982 | Broussaud |
| 4,421,381 A | 12/1983 | Ueda et al. |
| 4,553,436 A | 11/1985 | Hansson |

(List continued on next page.)

FOREIGN PATENT DOCUMENTS

| | | |
|---|---|---|
| DE | 19757181 A1 | 7/1999 |
| DE | 19800745 A1 | 7/1999 |

(List continued on next page.)

OTHER PUBLICATIONS

D.T. Neilson, V.A. Aksyuk, S. Arney, N.R. Basavanhally, K.S. Bhalla, D.J. Bishop, B.A. Boie, C.A. Bolle, J.V. Gates, A.M. Gottlieb, J.P. Hickey, N.A. Jackman, P.R. Kolodner, S.K. Korotky, B. Mikkelsen, F. Pardo, G. Raybon, R. Ruel, R.E. Scotti, T.W. Van Blarcum,, L. Zhang, and C.R. Giles, "Fully Provisional 112×112 Micro–Mechanical Optical Crossconnect With 35.8Tb/s Demonstrated Capacity," OFC 2000 Tech. Dig., Baltimore, Maryland, pp. 202–204 (Mar. 7–10, 2000).

(List continued on next page.)

Primary Examiner—Mohammad Sikder
(74) Attorney, Agent, or Firm—Blakely, Sokoloff, Taylor & Zafman LLP

(57) ABSTRACT

A micromachined apparatus for reflecting light is described that is designed to reduce losses in quality or intensity of light. Mirrors are used having lengths that are longer than their widths to reduce clipping of light when a mirror is located at an angle with respect to light falling thereon. Relatively long mirror torsion components are used to reduce forces required to pivot the mirrors. Regardless of the dimensions of the mirrors and the use of long torsion components, the mirrors are still located relatively close to one another. The relatively close positioning of the mirrors is due to a combined use of notches formed in support frames to which the torsion components are secured, oval shapes of the mirrors which take up less space than rectangular shapes, matching oval openings in the support frames, and the arrangement of the support frames in a non-rectangular array wherein tips of the support frames are located between one another.

2 Claims, 2 Drawing Sheets

U.S. PATENT DOCUMENTS

| | | |
|---|---|---|
| 4,598,585 A | 7/1986 | Boxenhorn |
| 4,613,203 A | 9/1986 | Proetel et al. |
| 4,626,066 A | 12/1986 | Levinson |
| 4,654,663 A | 3/1987 | Alsenz et al. |
| 4,706,374 A | 11/1987 | Murakami |
| 4,851,080 A | 7/1989 | Howe et al. |
| 4,922,756 A | 5/1990 | Henrion |
| 5,016,072 A | 5/1991 | Greiff |
| 5,068,203 A | 11/1991 | Logsdon et al. |
| 5,083,857 A | 1/1992 | Hornbeck |
| 5,097,354 A | 3/1992 | Goto |
| 5,121,180 A | 6/1992 | Beringhause et al. |
| 5,126,812 A | 6/1992 | Greiff |
| 5,172,262 A | 12/1992 | Hornbeck |
| 5,198,390 A | 3/1993 | MacDonald et al. |
| 5,203,208 A | 4/1993 | Berstein |
| 5,226,321 A | 7/1993 | Varnham et al. |
| 5,235,187 A | 8/1993 | Arney et al. |
| 5,247,222 A | 9/1993 | Engle |
| 5,255,332 A | 10/1993 | Welch et al. |
| 5,399,415 A | 3/1995 | Chen et al. |
| 5,428,259 A | 6/1995 | Suzuki |
| 5,444,566 A | 8/1995 | Gale et al. |
| 5,449,903 A | 9/1995 | Arney et al. |
| 5,488,862 A | 2/1996 | Neukermans et al. |
| 5,524,153 A | 6/1996 | Laor |
| 5,528,296 A | 6/1996 | Gove et al. |
| 5,555,558 A | 9/1996 | Laughlin |
| 5,563,343 A | 10/1996 | Shaw et al. |
| 5,581,643 A | 12/1996 | Wu |
| 5,594,820 A | 1/1997 | Garel-Jones et al. |
| 5,600,383 A | 2/1997 | Hornbeck |
| 5,608,468 A | 3/1997 | Gove et al. |
| 5,610,335 A | 3/1997 | Shaw et al. |
| 5,628,917 A | 5/1997 | MacDonald et al. |
| 5,629,790 A | 5/1997 | Neukermans et al. |
| 5,645,684 A | 7/1997 | Keller |
| 5,648,618 A | 7/1997 | Neukermans et al. |
| 5,661,591 A | 8/1997 | Lin et al. |
| 5,673,139 A | 9/1997 | Johnson |
| 5,726,073 A | 3/1998 | Zhang et al. |
| 5,726,815 A | 3/1998 | Gunter et al. |
| 5,828,800 A | 10/1998 | Henry et al. |
| 5,872,880 A | 2/1999 | Maynard |
| 5,912,608 A | 6/1999 | Asada |
| 5,920,417 A | 7/1999 | Johnson |
| 5,943,157 A | 8/1999 | Florence et al. |
| 5,943,454 A | 8/1999 | Aksyuk et al. |
| 5,960,132 A | 9/1999 | Lin |
| 5,960,133 A | 9/1999 | Tomlinson |
| 5,969,848 A | 10/1999 | Lee et al. |
| 5,995,688 A | 11/1999 | Aksyuk et al. |
| 5,998,816 A | 12/1999 | Nakaki et al. |
| 5,999,303 A | 12/1999 | Drake |
| 6,000,280 A | 12/1999 | Miller et al. |
| 6,002,818 A | 12/1999 | Fatehi et al. |
| 6,028,689 A | 2/2000 | Michalicek et al. |
| 6,028,690 A | 2/2000 | Carter et al. |
| 6,044,705 A | 4/2000 | Nuekermans et al. |
| 6,053,618 A | 4/2000 | Arpin |
| 6,062,697 A | 5/2000 | Bryant et al. |
| 6,072,617 A | 6/2000 | Henck |
| 6,075,239 A | 6/2000 | Aksyuk et al. |
| 6,075,639 A | 6/2000 | Kino et al. |
| 6,097,859 A | 8/2000 | Solgaard et al. |
| 6,097,860 A | 8/2000 | Laor |
| 6,121,552 A | 9/2000 | Brosnihan et al. |
| 6,128,121 A | 10/2000 | Choi et al. |
| 6,137,926 A | 10/2000 | Maynard |
| 6,020,272 A | 12/2000 | Fleming |
| 6,239,473 B1 | 5/2001 | Adams et al. |
| 6,245,590 B1 | 6/2001 | Wine et al. |
| 6,253,001 B1 | 6/2001 | Hoen |
| 6,256,430 B1 | 7/2001 | Jin et al. |
| 6,262,827 B1 | 7/2001 | Ueda et al. |
| 6,278,812 B1 | 8/2001 | Lin et al. |
| 6,289,145 B1 | 9/2001 | Solgaard et al. |
| 6,295,154 B1 | 9/2001 | Laor et al. |
| 6,320,993 B1 | 11/2001 | Laor |
| 6,330,102 B1 | 12/2001 | Daneman et al. |
| 6,396,976 B1 | 5/2002 | Little et al. |

FOREIGN PATENT DOCUMENTS

| | | |
|---|---|---|
| EP | 0 813089 A2 | 6/1997 |
| EP | 0 834759 A2 | 4/1998 |
| EP | 0 980014 A1 | 2/2000 |
| EP | 1 120677 A2 | 8/2001 |
| GB | 2 175705 A | 12/1986 |
| GB | 2 275 787 A | 9/1994 |
| GB | 2 328312 A | 2/1999 |
| JP | 60-107017 | 6/1985 |
| JP | 5-107485 A | 4/1993 |
| JP | 6-180428 | 6/1994 |
| JP | 2000-19434 A | 1/2000 |
| WO | 97/04283 | 2/1997 |
| WO | WO99/36941 | 7/1999 |
| WO | WO99/36948 | 7/1999 |
| WO | WO 99/66354 | 12/1999 |
| WO | 99/67666 | 12/1999 |
| WO | 00/20899 | 4/2000 |
| WO | 01/33898 A2 | 5/2001 |

OTHER PUBLICATIONS

Lih Y. Lin and Evan L. Goldstein, "Micro–Electro–Mechanical Systems (MEMs) for WDM Optical–Crossconnect Networks," IEEE, pp. 954–957 (1999).

PCT Invitation to Pay Additional Fees for PCT Counterpart Application No. PCT/US01/13964 Containing International Search Report (Jun. 18, 2002).

Robert E. Mihailovich et al., "Single–Crystal Silicon Torsional Resonators," School of Electrical Engineering, Cornell University, Ithaca, NY, IEEE, pp. 184–188 (1993).

Janusz Bryzek, Kurt Petersen, & Wendell McCulley, "Micromachines on the March," IEEE Spectrum, pp. 20–31, (May 1994).

"Lucent's New All–Optical Router Uses Bell Labs Microscopic Mirrors," Bells Labs press release, pp. 1–4, Nov. 10, 1999 http://www.bell–labs com/news/1999/november/10/1.html.

M. Adrian Michalicek, Wenge Zhang, Kevin F. Harsh, Victor M. Bright, and Y.C. Lee, "Micromirror Arrays Fabricated by Flip–Chip Assembly," Part of the SPIE Conference on Miniaturizes Systems with Micro–Optics and MEMs, Santa Clara, SPIE vol. 3878, pp. 68–79, (Sep. 1999).

Larry J. Hornbeck, "Digital Light Proecssing for High–Brightness, High–Resolution Applications." SPIE vol. 3013, San Jose, CA, pp. 27–40, (Feb. 1997).

Timothy J. Broshnihan, James M. Bustillo, Albert P. Pisano & Roger T. Howe, "Embedded Interconnect & Electrical Isolation for High–Aspect–Ratio, SOI Inertial Instruments," Berkeley Sensor & Actuator Sensor, pp. 637–640, Transducers '97, 1997 International Conference on Solid–State Sensors and Actuators (Chicago, Jun. 16–19, 1997) (Jun. 16–19, 1997).

Ming C. Wu, "MEMS for Optical and RF Applications." UCLA Extension, Department of Engineering, Information Systems and Technical Management, Engineering: 823.52, Nov. 1–3, 1999.

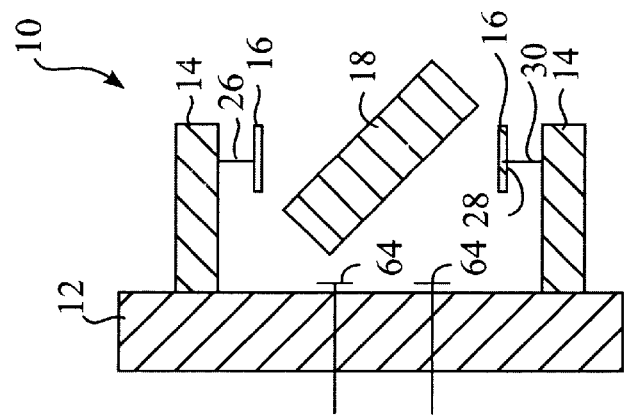
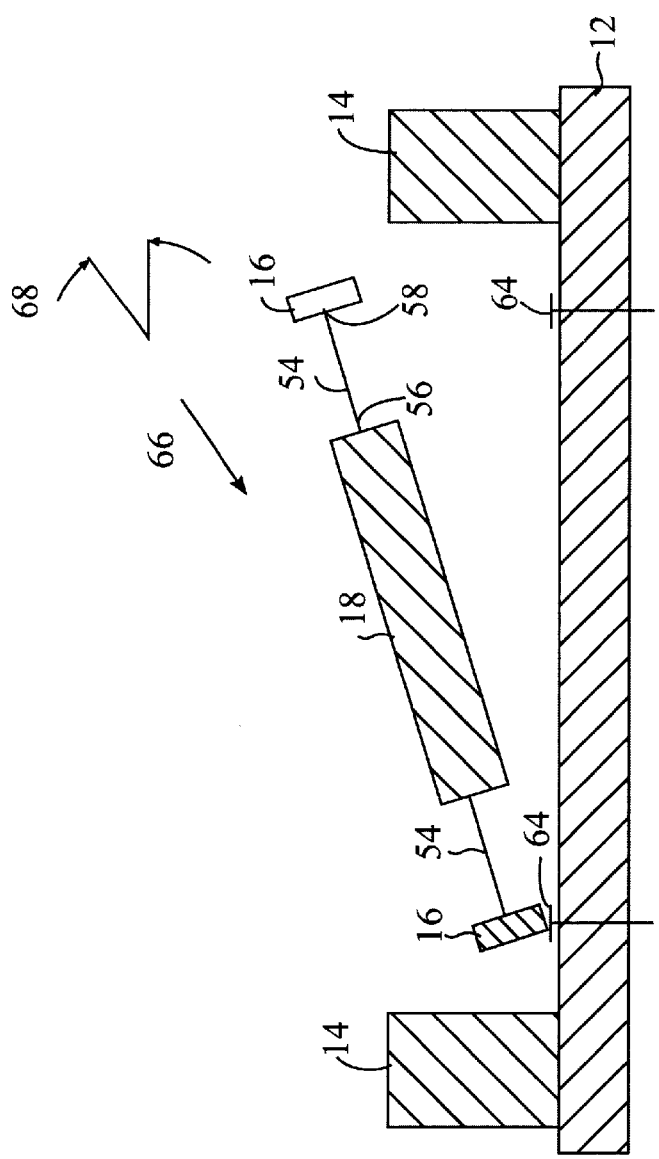

MICROMACHINED APPARATUS FOR IMPROVED REFLECTION OF LIGHT

CROSS REFERENCES

This is a divisional from U.S. patent application Ser. No. 09/574,660, filed May 18, 2000.

FIELD OF THE INVENTION

The invention relates to a micromachined apparatus for reflecting light.

BACKGROUND OF THE INVENTION

Optical fibers are commonly used in networks such as the Internet. Optical fibers are often bundled together in an array, each carrying different signals of light. In certain instances the signals of light carried by the different optical fibers have to be switched into a different arrangement. The optical fibers are provided as input fibers into an optical switch and further optical fibers are provided as output fibers from the optical switch. A micromachined apparatus for reflecting light from the input optical fibers is located in a path of light being emitted from the input optical fibers. The micromachined apparatus for reflecting light usually has an array of mirrors which are arranged in a manner similar to the input optical fibers. Each mirror reflects light from a respective input optical fiber to the output optical fibers. Each mirror can be pivoted so that the light reflected therefrom is directed to a selected one of the output optical fibers.

Losses in quality and intensity of the light used in such a switch may occur. Losses may be due to the mirrors being located too far apart or due to clipping of edges of bundles of light when the mirrors are located at an angle to the bundles of light. Locating the mirrors too close to one another may, however, require forces that are too high for purposes of pivoting the mirrors against torsion spring forces which tend to restore the mirrors.

SUMMARY OF THE INVENTION

A micromachined apparatus for reflecting light is provided comprising a support structure and a plurality of mirrors. Each mirror is pivotally secured to the support structure. A first to a third adjacent ones of the mirrors are located at corners of a first triangle. Each corner of the triangle is less than 90°.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which:

FIG. 2 is a cross-sectional side view on 2—2 in FIG. 1; and

FIG. 3 is a cross-sectional side view on 3—3 in FIG. 1.

DETAILED DESCRIPTION

Figure 1:
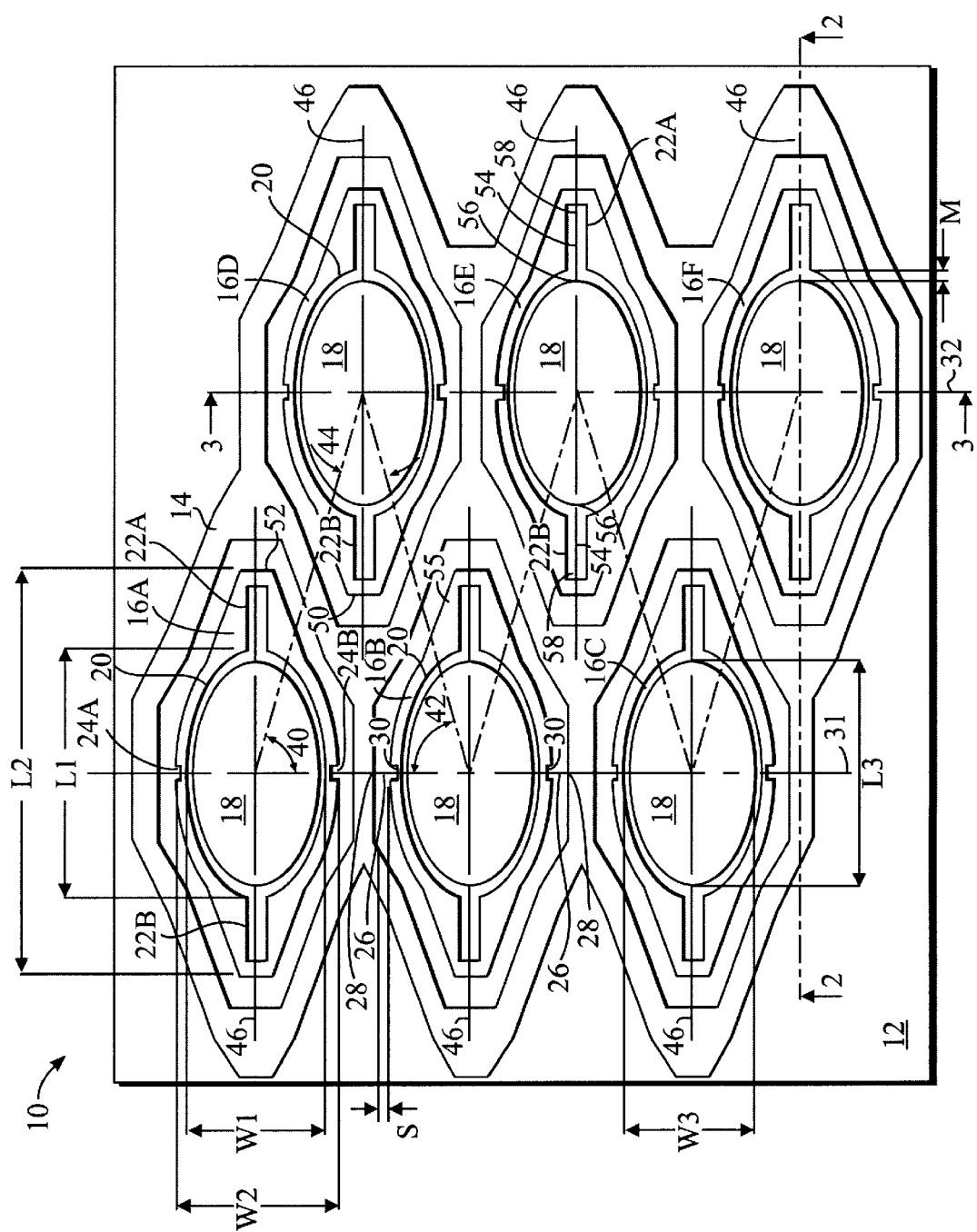
FIG. 1 is a plan view of a micromachined apparatus for reflecting light according to an embodiment of the invention.

A micromachined apparatus for reflecting light is described that is designed to reduce losses in quality or intensity of light. "Micromachined" refers to structures fabricated by selective etching or deposition. As described in more detail below mirrors are used having lengths that are longer than their widths to reduce clipping of light when a mirror is located at an angle with respect to light falling thereon. Relatively long mirror torsion components are used to reduce forces required to pivot the mirrors. Regardless of the dimensions of the mirrors and the use of long torsion components, the mirrors are still located relatively close to one another. The relatively close positioning of the mirrors is due to a combined use of notches formed in support frames to which the torsion components are secured, oval shapes of the mirrors which take up less space than rectangular shapes, matching oval openings in the support frames, and the arrangement of the support frames in a non-rectangular array wherein tips of the support frames are located between one another.

FIG. 1 to FIG. 3 of the accompanying drawings illustrate a micromachined apparatus 10 for reflecting light according to an embodiment of the invention. The apparatus 10 includes a substrate 12, a support structure 14, a plurality of support frames 16, and a plurality of mirrors 18 and may be manufactured utilizing photographic techniques, ion etching techniques or any other technique as will be evident to a person skilled in the art.

The support structure 14 is formed on the substrate 12 so as to be secured to the substrate 12. The support structure 14 is in the form of a honeycomb defining generally hexagonal openings. In one implementation, the substrate is fabricated from silicon, the support structure 14 is formed by a reactive ion etching of silicon, and the mirrors 18 are formed by etching silicon.

Each frame 16 is formed to define an oval opening 20. Deep notches 22A and 22B are formed in a surface of the oval opening 20. The notches 22A and 22B are formed at 0° and 180° about the oval opening 20, respectively. Notches 24A and 24B are also formed in an outer surface of the frame 16. The notches 24A and 24B are located at 90° and 270° on the outer surface of the support frame 16.

The oval shape 20 has a length L1 and a width W1. The length L1 extends between the notches 22A and 22B and the width W1 between the notches 24A and 24B. The length L1 is typically about 320 microns and the width W1 is about 270 microns. The oval shape 20 thus has a long axis between the notches 22A and 22B. Because of the oval shape 20 and its orientation, and to allow for the notches 22A and 22B to be formed, the frame 16 has a length L2 and a width W2 wherein the length L2 is much larger that the width W2. The frame 16 thus takes up more space along its length L2 than along its width W2. The length L2 is typically about 520 microns and the width W2 about 340 microns.

Each frame 16 is located within a respective opening in the support structure 14 and is secured to the support structure 14 with two frame torsion components 26. Each frame torsion component 26 has a first end 28 and a second, opposing end 30. The first end 28 is non-rotationally secured to the support structure 14. The frame torsion component 26 extends from the first end 28 into a respective one of the notches 24A or 24B, and the second end 30 is non-rotationally secured to the frame 16. The frame 16 is thereby suspended above the substrate 12 by the frame torsion components 26. The frame 16 has a minimum spacing S as measured from directly next to the notch 24A to the support structure 14. The frame torsion component 26 has a torsion length from the end 26 to the end 30 which is more than the minimum spacing S.

The frame 16 can be pivoted about an axis through the frame torsion components 26. The entire length of each frame torsion component 26, i.e. from its end 28 to its end 30, winds up, or twists against a torsion spring force thereof, thus tending to return the frame 16 to its original position. It can thus be seen that, although the minimum spacing S can be kept relatively small, each spring torsion component 26 has a torsion length that is relatively long, in particular longer than the minimum spacing S. By keeping the torsion length relatively long, a torsion spring constant of each spring portion component can be increased with a corresponding decrease in torsion required to pivot the frame 16 by a predetermined degree. The relatively long torsion length is allowed for due to the extra space provided by the notch 24A or 24B. Another thinner frame having less material may also provide a similar amount of space but may include too little material for purposes of strength. The notches 24A or 24B thus provide additional space while maintaining strength in the frame 16.

The frames 16 are located in a nonrectangular array. The frames 16A, 16B, and 16C pivot about a common frame axis 31 and the frames 16D, 16E, and 16F pivot about a common frame axis 32 which is parallel to and spaced from the frame axis 31. A line can be constructed from a center point of an oval opening 20 of one frame (e.g. 16A) to an oval opening 20 of an adjacent frame (e.g. 16D). By constructing such lines between adjacent oval openings 20, it can be seen that center points of the oval openings 20 are located at corners of contiguous triangles. For example, the oval openings 20 of the frames 16A, 16B, and 16D are located respectively at corners 40, 42, and 44 of one triangle. Each corner, 40, 42, and 44 is less than 90°. The corners 40 and 42 are equal to one another. By so locating the frames 16, a zigzag pattern is created following center points of oval openings of the frames 16A, 16D, 16B, 16E, 16C, and 16F.

Each oval opening 20 has a center line 46 extending along its length L1. The center line 46 of the oval opening 16D is spaced and parallel to the center line 46 of the oval opening 20 of the frame 16A. Similarly, the center line 46 of the oval opening 20 of the frame 16B is spaced and parallel to the center line 46A of the oval opening 20 of the frame 16D, and so on. By so locating the frames 16, a tip 50 of the frame 16D near the notch 22B thereof can be located between tips 52 and 55 of the frames 16A and 16B, respectively.

By locating the tip 50 between the tips 52 and 55, the center points of the oval openings of the frames 16A, 16B, and 16D can be located closer to one another. This can be accomplished even though each frame 16 has a relatively long length L2. The frames 16 are then located over a smaller area than would for example be possible in a rectangular array.

Each mirror 18 has an approximate oval shape with a length L3 and a width W3. The length L3 is typically about 300 microns and the width W3 about 250 microns. Each mirror 18 is located within a respective oval opening 20 with its length L3 along the length L1 of the oval opening 20 and its width W3 along the width W1 of the oval opening 20. Each mirror 18 is secured to a respective frame 16 with two mirror torsion components 54. Each mirror torsion component 54 has first and second opposed ends 56 and 58 respectively. The first end 56 is non-rotationally secured to the mirror 18. The mirror torsion component 54 extends from the first end 56 into a respective one of the notches 22A or 22B. The second end 58 of the mirror torsion component 54 is non-rotationally secured to the frame 16 within the notch 22A or 22B. The mirror 18 is thereby suspended within the oval opening 20 of the frame 16. A center point of the mirror 18 coincides with a center point of the oval opening 20. There is a minimum spacing M as measured from a surface of the mirror 18 to a surface of the oval opening 20 directly next to the notch 22A. Although the minimum spacing M is relatively small, the mirror torsion component 54 is relatively long due to the depth of the notch 22A while still maintaining strength of the frame 16.

The mirror can pivot relative to the frame 16 about the center line 46, whereupon each mirror torsion component 54 winds up, or twists against a torsion spring force thereof. The entire length of the mirror torsion component from the first end 56 to the second end 58 winds up, or twists. The length of each mirror torsion component 54 allows it to have a higher torsion spring constant with a corresponding smaller force being applied to rotate the mirror 18 by a certain degree.

Electrostatic terminals 64 are formed on the substrate 12. The electrostatic terminals 64 are used to pivot the frame 16 or the mirror 18 by electrostatic attraction. The support structure 14 also serves as an electrostatic barrier between electrostatic terminals and adjacent mirrors 18. The apparatus 10 may be used in an optical switch wherein a respective circular bundle of light shines from a respective optical fiber onto a respective one of the mirrors 18. The light may shine in a direction 66 which is at an angle 68 of, for example, 45° with respect to a plane in which the substrate 12 extends. A usable portion of the bundle of light falls between the width W3 of the mirror 18. The bundle of light is usually circular in cross section so that it typically has a usable length which equals its usable width. Because of its length L3 of the mirror 18, the entire usable length of the bundle of light falls on the mirror 18. The oval shape of the mirror 18 thereby allows for the entire usable width and length of the bundle of light to be reflected therefrom, even though the light shines in the direction 66 and even when the frame 16 is pivoted as shown in FIG. 2 so that the mirror 18 is pivoted with respect to the frame 16. It should be noted that the oval shape of each mirror 18 also makes more efficient use of space than for example a rectangular mirror, thereby allowing for the mirrors 18 and frames 16 to be located over a smaller area.

Mirrors 18 are thus used which have lengths L3 which are longer than their widths W3. In addition, relatively long mirror torsion components 54 and frame torsion components 56 are used. Regardless of the dimensions of the mirrors 18 and the torsion components 54 and 26, the mirrors 18 are still located relatively close to one another. The relatively close positioning of the mirrors 18 is due to a combined use of a honeycomb support structure 14 which also serves as an electrostatic barrier, the notches 22A, 22B, 24A, 24B, the oval shapes of the mirrors 18 together with closely matching shapes of the oval openings 20, and the arrangement of the frames 16 in a non-rectangular array wherein a tip 50 can be located between the tips 52 and 54. By locating the mirrors closer to one another a smaller array is formed. A smaller array results in a smaller optical switch and a reduction in path length that light has to travel before reaching and after being reflected by a mirror. A reduction in path length of the light reduces losses in quality and intensity of light.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather that a restrictive sense.

What is claimed is:

1. A micromachined apparatus for reflecting light, comprising:

a support structure;

a plurality of support frames pivotally secured to the support structure and being located in first and second substantially parallel lines, the support frames in the first line pivoting about a first support frame axis and the support frames in the second line pivoting about a second support frame axis which is spaced and substantially parallel to the first support frame axis, a respective support frame in the second line being partially located between adjacent ones of the two of the support frames in the first line; and a plurality of mirrors, each being secured to a respective support frame so as to be pivotal about a respective mirror axis transverse to a respective support frame axis about which the support frame pivots.

2. An apparatus according to claim 1, further comprising an electrostatic barrier structure located between the support frames and being formed so as to completely surround each support frame.

* * * * *